(12) United States Patent
Miller et al.

(10) Patent No.: US 12,430,569 B2
(45) Date of Patent: Sep. 30, 2025

(54) SYSTEMS AND METHODS FOR PROVIDING MEDIA CONTENT RECOMMENDATIONS

(71) Applicant: Adeia Guides Inc., San Jose, CA (US)

(72) Inventors: Kyle Miller, Durham, NC (US); Bryan S. Scappini, Cary, NC (US); James W. Lent, Durham, NC (US)

(73) Assignee: Adeia Guides Inc., San Jose, CA (US)

( * ) Notice: Subject to any disclaimer, the term of this patent is extended or adjusted under 35 U.S.C. 154(b) by 516 days.

(21) Appl. No.: 17/678,713

(22) Filed: Feb. 23, 2022

(65) Prior Publication Data

US 2022/0180216 A1 Jun. 9, 2022

Related U.S. Application Data

(63) Continuation of application No. 16/370,101, filed on Mar. 29, 2019, now Pat. No. 11,288,582.

(51) Int. Cl.
*G06F 16/9535* (2019.01)
*G06F 16/34* (2025.01)
*G06N 3/12* (2023.01)
*G06N 5/02* (2023.01)
(Continued)

(52) U.S. Cl.
CPC ............ *G06N 5/02* (2013.01); *G06N 3/12* (2013.01); *G06Q 30/0202* (2013.01); *H04N 21/251* (2013.01)

(58) Field of Classification Search
CPC ........ G06N 5/02; G06N 3/12; G06Q 30/0202; H04N 21/251; H04N 21/252; H04N 21/25891; H04N 21/4662; H04N 21/4668; G06F 16/735; G06F 16/74
See application file for complete search history.

(56) References Cited

U.S. PATENT DOCUMENTS 6,388,714 B1  5/2002 Schein et al.
6,756,997 B1  6/2004 Ward et al.
(Continued)

OTHER PUBLICATIONS

International Search Report and Written Opinion of PCT/US2020/025500 dated Jun. 8, 2020.
(Continued)

*Primary Examiner* — Brandon S Cole
(74) *Attorney, Agent, or Firm* — HALEY GUILIANO LLP

(57) ABSTRACT

Systems and associated methods are described for providing content recommendations. The system accesses a plurality of recommendation algorithms and assigns a plurality of weight values to each prediction algorithm. Then, the system generates a set of candidate weight combinations, such that each candidate combination includes a weight value assigned to each prediction algorithm. Then requests for content items are received over a predetermined period of time. For each combination, the system generates a set of recommended content items and an evaluation metric that is based on matches with requests. Afterwards, the system replaces a candidate combination that resulted in a generation of a lowest evaluation metric. The aforementioned steps are repeated until the evaluation metrics stop improving. Then display identifiers are displayed for a set of recommended content items generated for a candidate combination with the highest evaluation metric.

20 Claims, 9 Drawing Sheets

(51) Int. Cl.
*G06Q 30/0202* (2023.01)
*H04N 21/25* (2011.01)

(56) References Cited

U.S. PATENT DOCUMENTS

| | | | |
|---|---|---|---|
| 7,533,037 B1* | 5/2009 | Noble | G06Q 30/0202 |
| | | | 705/7.31 |
| 7,761,892 B2 | 7/2010 | Ellis et al. | |
| 8,613,024 B2 | 12/2013 | Bovenschulte et al. | |
| 9,419,899 B2 | 8/2016 | Jenkins et al. | |
| 10,573,312 B1 | 2/2020 | Thomson et al. | |
| 10,832,087 B1 | 11/2020 | Wang et al. | |
| 11,288,582 B2* | 3/2022 | Miller | H04N 21/4668 |
| 2008/0050357 A1 | 2/2008 | Gustafsson et al. | |
| 2010/0054592 A1 | 3/2010 | Nanu et al. | |
| 2011/0047110 A1* | 2/2011 | Rinkus | G06N 3/02 |
| | | | 706/18 |
| 2011/0153393 A1 | 6/2011 | Raff et al. | |
| 2013/0167168 A1 | 6/2013 | Ellis et al. | |
| 2015/0019640 A1* | 1/2015 | Li | G06F 16/248 |
| | | | 709/204 |
| 2015/0081471 A1 | 3/2015 | Cheng et al. | |
| 2015/0120722 A1* | 4/2015 | Martn Martnez | |
| | | | G06F 16/9535 |
| | | | 707/733 |
| 2015/0150517 A1* | 6/2015 | Batchinsky | G16H 50/30 |
| | | | 600/301 |
| 2016/0057499 A1 | 2/2016 | Foerster et al. | |
| 2016/0232157 A1* | 8/2016 | Mansour | G06F 16/34 |
| 2017/0214701 A1 | 7/2017 | Hasan | |
| 2018/0082189 A1 | 3/2018 | Cormier et al. | |
| 2018/0082207 A1 | 3/2018 | Cormier et al. | |
| 2018/0150522 A1 | 5/2018 | Moskwinski et al. | |
| 2018/0189826 A1 | 7/2018 | Xu et al. | |
| 2019/0295151 A1* | 9/2019 | Ghadar | G06F 16/9038 |
| 2019/0342616 A1* | 11/2019 | Domm | G06Q 50/01 |
| 2020/0175961 A1 | 6/2020 | Thomson et al. | |
| 2020/0211107 A1 | 7/2020 | Srivastava et al. | |
| 2020/0302234 A1 | 9/2020 | Walters et al. | |

OTHER PUBLICATIONS

Sadeghi, et al., "Recommender systems based on evolutionary computing: A Survey", Journal of Software Engineering and Applications, vol. 10, No. 05, May 25, 2017, pp. 407-421 (2017).

Soni Devin, "Introduction to Evolutionary Algorithms", Optimization by natural selection. https://towardsdatascience.com/introduction-to-evolutionary-algorithms-a8594b484ac Feb. 18, 2018.

* cited by examiner

SYSTEMS AND METHODS FOR PROVIDING MEDIA CONTENT RECOMMENDATIONS

CROSS-REFERENCE TO RELATED APPLICATION(S)

This application is a continuation of U.S. patent application Ser. No. 16/370,101, filed on Mar. 29, 2019, the disclosure of which is hereby incorporated by reference herein in its entirety.

BACKGROUND

The present disclosure relates to systems and methods for providing media content recommendations, and more particularly to systems and related processes for arbitrating between multiple content recommendation algorithms.

SUMMARY

Modern media distribution systems often need to provide media content item recommendations and predictions. Many different algorithms and techniques may be used to select media content items that are relevant to a user (or to certain user demographics) to maximize the probability of displaying recommendations that are relevant (e.g., by presenting identifiers of media content items that the user is likely to watch). For example, a media distribution system may recommend media content based on content previously watched by the user, partially watched episodes, popularity of content among many users, or a variety of other prediction algorithms.

Media distribution systems are commonly unable to select an optimal algorithm among many available choices. In one approach, the algorithms are selected by a human curator on an ad-hoc basis. For example, a human administrator may manually select media content to be recommended to a specific user demographic. For example, a human curator may choose to present some results based on a "previously watched content" prediction algorithm and some results based on a "popularity" prediction algorithm. However, such a manual approach to algorithm use is inherently inefficient and time-consuming. It is unlikely that a human administrator would be able to select an optimal or near-optimal combination of algorithms that would result in an effective list of media content recommendations.

To address these shortcomings, systems and methods are described herein that leverage differential evolution techniques to select an optimal or near-optimal combination of recommendation algorithms for selecting recommended content. For example, a content recommendation application may use an evolutionary weight selection approach to select media content items that a user is most likely to watch (predicted media content) and generate for display identifiers of those content items by iteratively adjusting weights for a combination of recommendation algorithms. A content recommendation application may have access to several recommendation algorithms (e.g., content request prediction algorithms). Initially, the content recommendation application may assign some weight values to each prediction algorithm. For example, initial values may be selected randomly, or based on predetermined heuristics (e.g., algorithms used commonly in the past may be weighted more highly), or by using a specified algorithm. Then the weights are iteratively adjusted based on empirical data until an optimal or near-optimal combination of algorithms is achieved.

For example, the content recommendation application may select several weight combinations for empirical testing. For example, each candidate weight combination may have a weight value assigned to each prediction algorithm. The content recommendation application may then generate a set of recommended content items for each weight combination, using the results generated by each prediction algorithm and weight values of that candidate combination. Next, the content recommendation application may monitor requests for content items over a certain period of time (e.g., a day, or a week). For example, the content recommendation application may track requests from a single user or from several (e.g., 3000) active users in the same demographical category.

The matches between requests and predictions generated by each candidate combination are scored to calculate an evaluation metric for each candidate combination. The evaluation metric is then used to adjust weight combinations, remove weight combinations, and/or generate new weight combinations. For example, new weight combinations are generated using differential evolution techniques to attempt to maximize the calculated evaluation metrics. For example, the content recommendation application may remove the lowest scoring candidate weight combination and replace it with a new weight combination. In one implementation, the new weight combination is generated using a mutation of a more successful candidate weight combination. In another example, the new weight combination is generated using a crossover of two or more other more successful candidate weight combinations.

The content recommendation application may then repeat the steps of generating candidate weight combinations and empirically evaluating the results until the evaluation metrics stop improving compared to previous cycles. For example, the repetition may cease if the improvement in the evaluation metrics is less than 1% over a certain number of cycles (e.g., over three cycles).

Once the best weight combination is determined, the content recommendation application uses that weight combination to acquire optimized media content recommendations and generate for display identifiers for these content items. For example, the content recommendation application may generate these identifiers as part of an EPG (electronic programming guide) of a cable system (e.g., Cox™ or Verizon™), or as part of an OTT (over-the-top) media streaming application (e.g., Netflix™ or Amazon™).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
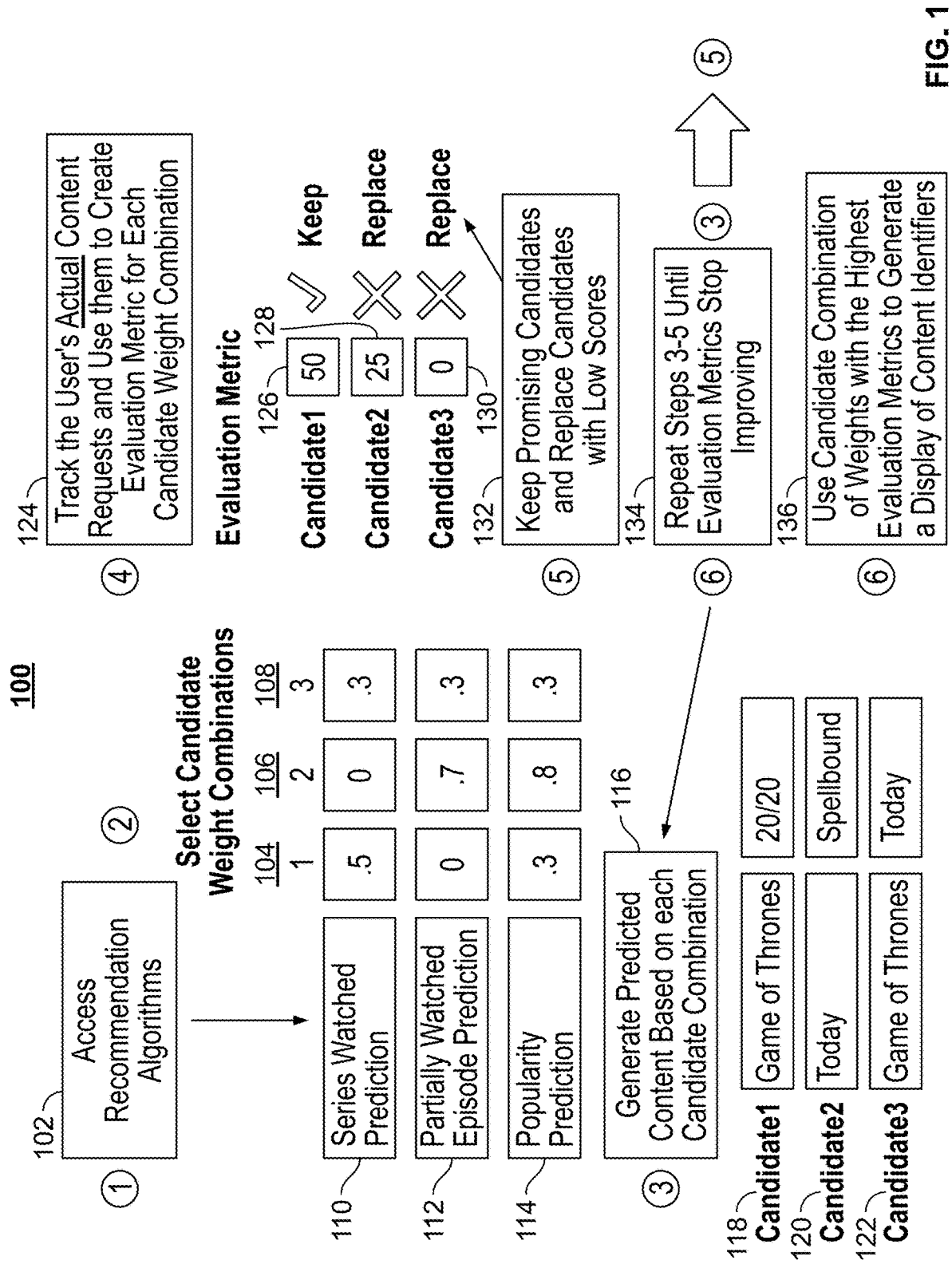
FIG. 1 depicts an illustrative scenario for a content recommendation application providing media content recommendations, in accordance with some embodiments of the disclosure.

FIG. 1 depicts an illustrative scenario for a content recommendation application providing media content recommendations. Media content may refer to any kind of video, audio, text, or multimedia content, or any combination thereof. For example, a media content item may be a TV show, a movie, a song, a podcast, a video game, any other type of media or any combination thereof.

At step 102, the content recommendation application may access several recommendation algorithms (e.g., algorithms 110, 112, and 114). For example, algorithm 110 may provide a list of content items that are predicted to be watched by a user (or a certain demographic of users) based on TV series that were previously watched (for example, the user may be predicted to request content items that are similar to series that the user has watched in the past). Algorithm 112 may provide a list of content items that are predicted to be watched by a user (or a certain demographic of users) based on TV episodes that were partially watched in the past (for example, the user may be predicted to request content items that the user has watched, but did not finish watching). Algorithm 114 may provide a list of content items that are predicted to be watched by a user (or a certain demographic of users) based on general popularity of certain content items. In some embodiments, the recommendation algorithms may be available locally or accessible via an API (Application Program Interface) call. Each of the algorithms may be based on more granular factors that are also weighted. For example, algorithm 114 may weigh the popularity of a content item with a matching demographic more highly than its popularity with other demographics.

The content recommendation application may the generate several candidate weight combinations 104, 106, 108. For example, to create combination 104, the content recommendation application assigns weight 0.5 to algorithm 110, weight 0 to algorithm 112, and weight 0.3 to algorithm 114. Similarly, to create combination 106, the content recommendation application assigns weight 0 to algorithm 110, weight 0.7 to algorithm 112, and weight 0.8 to algorithm 114. Further, to create combination 108, the content recommendation application assigns weight 0.3 to algorithm 110, weight 0.3 to algorithm 112, and weight 0.3 to algorithm 114. These weights may initially be selected at random, using a heuristic, or via human input. The weight values may be similar to parameter value used in other known differential evolution techniques. The content recommendation application may use any of the recommendations engines and recommendations techniques as described in U.S. Pat. No. 6,388,714 and in U.S. Pat. No. 6,756,997 (both of which are hereby incorporated by reference herein in their entirety). The content recommendation application may also use any of the predictive engines or techniques as described in U.S. Pat. No. 8,613,024 and in U.S. Patent Application Publication No. 2018/0189826 (both of which are hereby incorporated by reference herein in their entirety).

At step 116, the content recommendation application may generate sets of predicted media content items based on each of candidate weight combinations 104, 106, 108. For example, each of the algorithms may generate its own preliminary list of media content items, and then weights of each combination may be used to pick content items for each candidate weight combination (e.g., as explained in more detail in FIGS. 6 and 7).

For example, candidate combination 104 may result in a set of predicted content items 118 that includes a "Game of Thrones" episode and a "20/20" episode. Candidate combination 106 may result in a set of predicated content items 120 that includes a "Today" episode and the movie "Spellbound". Candidate combination 108 may result in a set of predicated content items 122 that includes a "Game of Thrones" episode and a "Today" episode.

At 124, the content recommendation application may track requests by a user or a set of users. For example, requests by a single user can be tracked for a week. In some embodiments, a group of users (e.g., 1000 users) can be selected for tracking, where the group includes active users (i.e., those who consume media content often) and who belong to the same demographic category (e.g., 18-45 age group). In the case of group tracking, a shorter time period may be used (e.g., one day). The matches between requested content items and predictions 118, 120, 122 are scored to create an evaluation metric for each candidate combination. For example, the content recommendation application may assign higher evaluation metric scores to weight combinations that resulted in the most matches with requested content.

Candidate weight combination 104 may have resulted 126 in a score of 50 (e.g., because its predictions were requested 50 times by users over the tracking period). Candidate weight combination 106, may have resulted 128 in a score of 25 (e.g., because its predictions were requested 25 times by users over the tracking period). Candidate weight combination 108 may have resulted 130 in score of 0 (e.g., because its predictions were not requested by users over the tracking period).

At 132, the content recommendation application may decide to keep or replace some of the candidate weight combinations. For example, the content recommendation application may replace candidate weight combinations that resulted in evaluation metrics that are lower than a threshold. In some embodiments, the content recommendation application may replace candidate weight combinations that resulted in the lowest evaluation metric. In some embodiments, the content recommendation application may use a differential evolutionary algorithm to select which candidate weight combinations should be replaced in order to optimize the evaluation metric. For example, weight combination 104 may be kept, while weight combinations 106 and 108 may be replaced. The replacement weight combination may be generated using differential evolutionary techniques. For example, non-promising candidate weight combinations may be replaced with mutated versions of promising candidate weight combinations or with crossovers of promising candidate weight combinations. The differential evolution method may refer to any method or algorithm that optimizes a problem by iteratively trying to improve a candidate solution with regard to a given measure of quality. Such methods are commonly known as metaheuristics as they make few or no assumptions about the problem being optimized and can search very large space of candidate solutions. Use of the differential evolution method with a measure of quality being determined empirically to optimize weights of algorithms allows for detection of optimal or near optimal selection of different algorithms to create the most relevant set of recommendations.

At 134, steps 116-132 may be repeated until evaluation metrics stop improving (e.g., in accordance with iterative differential evolution methods). For example, when evaluation metrics improve by less than 1% over several cycles, the content recommendation application may stop the repetition of steps 116-132. At 136, the content recommendation application may use the candidate weight combinations that resulted in the highest evaluation to select a final set of predicted media content items. Identifiers of those content items may then be generated for display. For example, whenever a member of the demographic group that was monitored in step 124 opens an EPG or front screen of an OTT service, the content recommendation application may generate for display selectable identifiers of the final set of recommended media content items.

Figure 2:
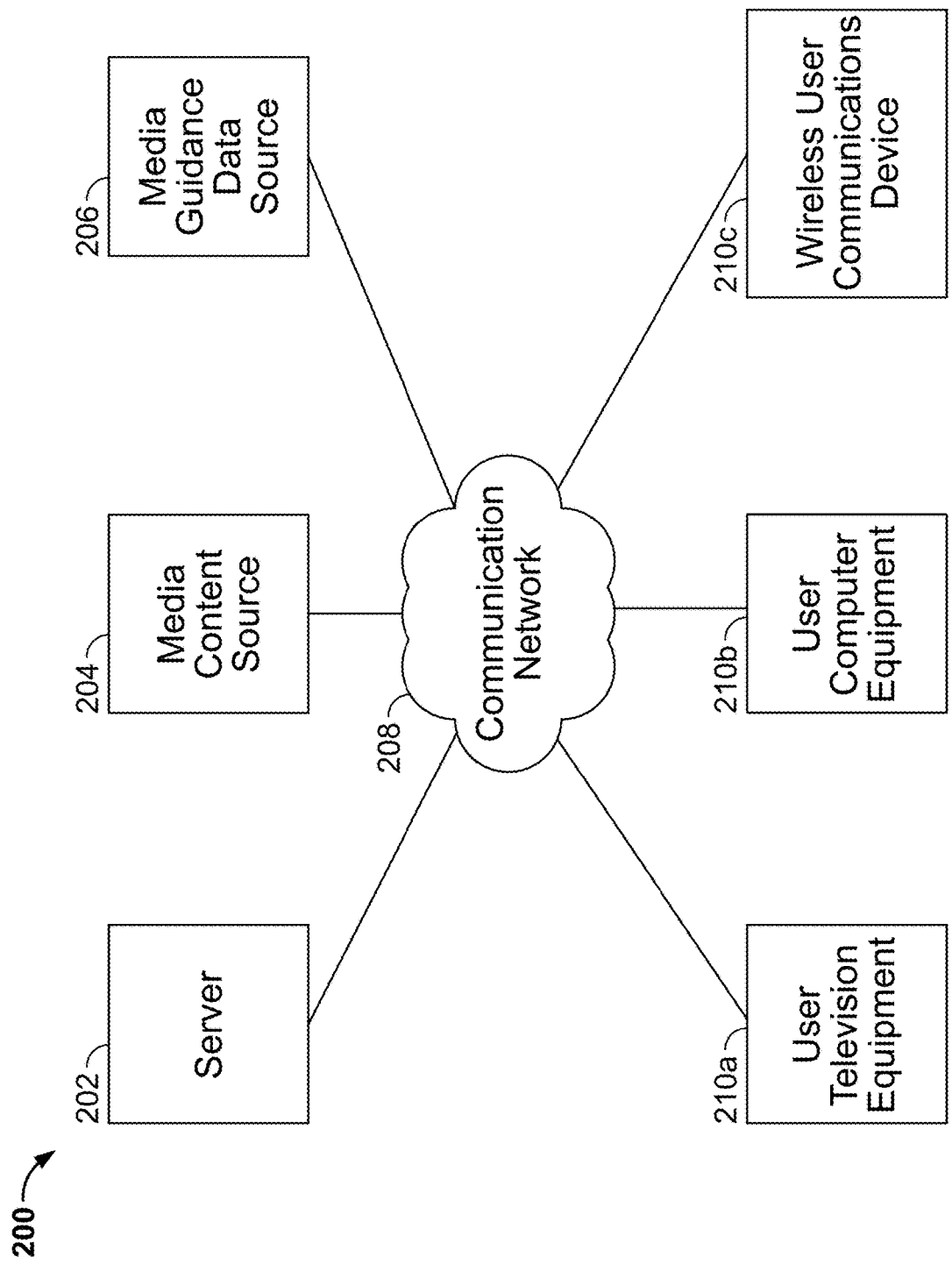
FIG. 2 shows an illustrative block diagram of a system hosting the media delivery application, in accordance with some embodiments of the disclosure.

FIG. 2 shows an illustrative block diagram of a system 200 for displaying content based on event monitoring, in accordance with some embodiments of the disclosure. In various aspects, system 200 includes one or more of server 202, media content source 204, media guidance data source 206, communication network 208, and one or more computing devices 210, such as user television equipment 210a (e.g., a set-top box), user computer equipment 210b (e.g., a laptop), and/or wireless user communications device 210c (e.g., a smartphone device). Although FIG. 2 shows one of each component, in various examples, system 200 may include fewer than the illustrated components and/or multiples of one or more illustrated components. Communication network 208 may be any type of communication network, such as the Internet, a mobile phone network, mobile voice or data network (e.g., a 4G or LTE network), cable network, public switched telephone network, or any combination of two or more of such communication networks. Communication network 208 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 208 communicatively couples various components of system 200 to one another. For instance, server 202 may be communicatively coupled to media content source 204, media guidance data source 206, and/or computing device 210 via communication network 208.

In some examples, media content source 204 and media guidance data source 206 may be integrated as one device. Media content source 204 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 204 may be the originator of content (e.g., a television broadcaster, a Webcast provider, etc.) or may not be the originator of content (e.g., an on-demand content provider, an Internet provider of content of broadcast programs for downloading, etc.). Media content source 204 may include cable sources, satellite providers, on-demand providers, Internet providers, over-the-top content providers, or other providers of content. Media content source 204 may also include a remote media server used to store different types of content (e.g., including video content selected by a user) in a location remote from computing device 210. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 204 and media guidance data source 206 may provide content and/or media guidance data to computing device 210 and/or server 202 using any suitable approach. In some embodiments, media guidance data source 206 may provide a stand-alone interactive television program guide that receives program guide data via a data feed (e.g., a continuous feed or trickle feed). In some examples, media guidance data source 206 may provide program schedule data and other guidance data to computing device 210 on a television channel sideband, using an in-band digital signal, an out-of-band digital signal, or any other suitable data transmission technique.

As described in further detail below, server 202 manages the communication of a live content stream (e.g., a live sporting event broadcast, a live news broadcast, or the like) and recorded streams from media content source 204 to computing device 210 via communication network 208. For instance, in some embodiments, content from media content source 204 and/or guidance data from media guidance data source 206 may be provided to computing device 210 using a client/server approach. In such examples, computing device 210 may pull content and/or media guidance data from server 202 and/or server 202 may push content and/or media guidance data to computing device 210. In some embodiments, a client application residing on computing device 210 may initiate sessions with server 202, media content source 204, and/or media guidance data source 206 to obtain content and/or guidance data when needed, e.g., when the guidance data is out of date or when computing device 210 receives a request from the user to receive content or guidance data. In various aspects, server 202 may also be configured to detect events within the live content stream and, based on the detected events, control the display of content and/or navigation menu options via computing device 210. Additionally, although FIG. 2 shows media content source 204 and media guidance data source 706 as separate from server 202, in some embodiments, media content source 204 and/or media guidance data source 206 may be integrated as one device with server 202.

Content and/or media guidance data delivered to computing device 210 may be over-the-top (OTT) content. OTT content delivery allows Internet-enabled user devices, such as computing device 210, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 210.

Figure 3:
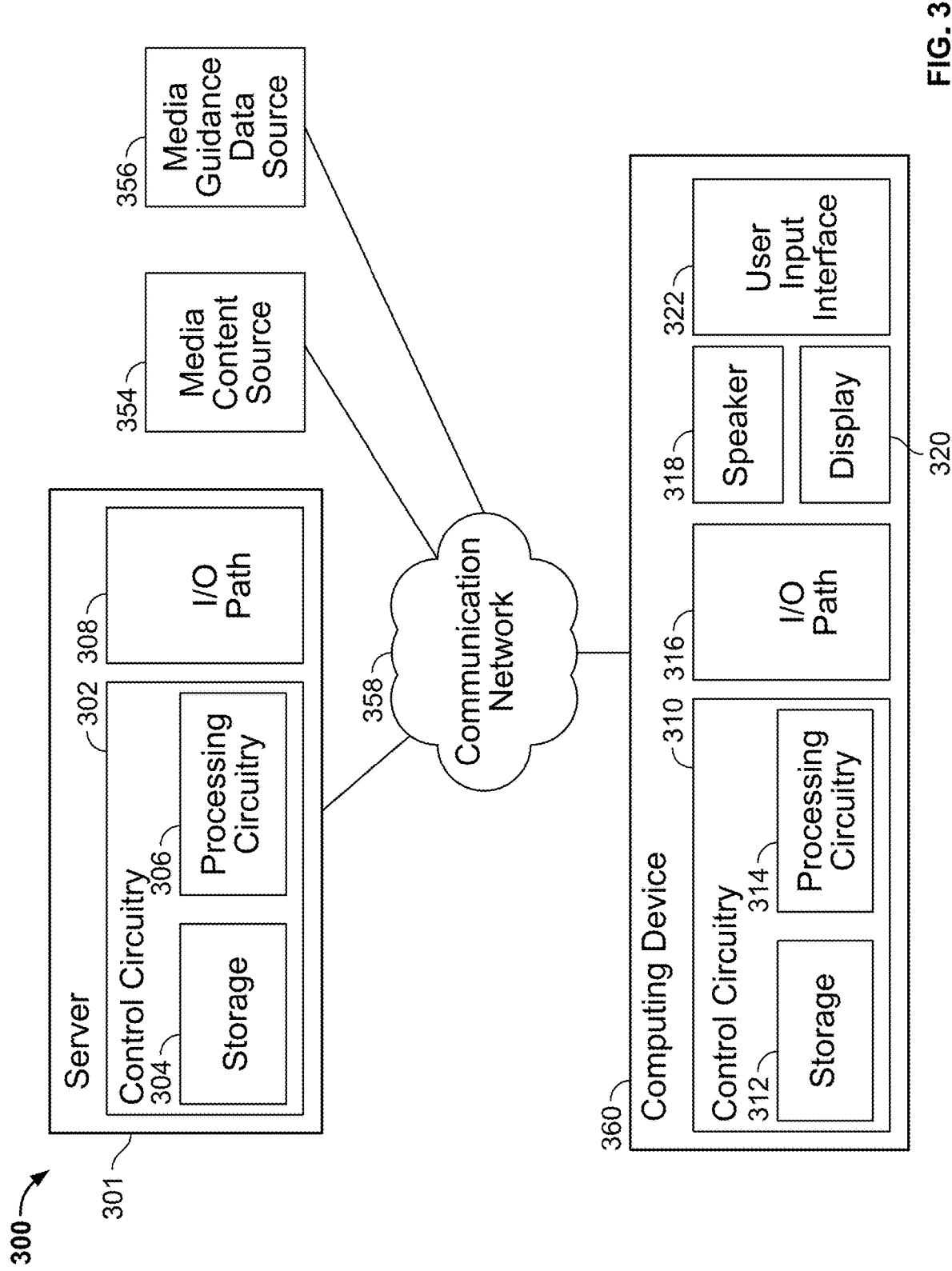
FIG. 3 is an illustrative block diagram showing additional details of a system hosting the media delivery application, in accordance with some embodiments of the disclosure.

FIG. 3 is an illustrative block diagram showing additional details of the system 300 (which may be the same as system 200 of FIG. 7), in accordance with some embodiments of the disclosure. In particular, server 301 (e.g., the same server as server 202) includes control circuitry 302 and I/O path 308, and control circuitry 302 includes storage 304 and processing circuitry 306. Computing device 360 (e.g., one or more of devices 210a, 210, and 210c) includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of media content source 354, media guidance data source 356, and/or the like) may be an electronic storage device. In some embodiments, media content source 354 may be the same as media content source 204. In some embodiments, media guidance data source 356 may be the same as media content source 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, media guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for a content recommendation application stored in memory (e.g., storage 304 and/or 312). Specifically, control circuitry 302 and/or 310 may be instructed by the content recommendation application to perform the functions discussed herein. In some implementations, any action performed by control circuitry 302 and/or 310 may be based on instructions received from the content recommendation application. For example, the content recommendation application may be implemented as software or a set of executable instructions that may be stored in storage 304 and/or 312 and executed by control circuitry 302 and/or 310. In some embodiments, the content recommendation application may be a client/server content recommendation application where only a client content recommendation application resides on computing device 360, and a server content recommendation application resides on server 301.

The content recommendation application may be implemented using any suitable architecture. For example, it may be a stand-alone content recommendation application wholly implemented on computing device 360. In such an approach, instructions for the content recommendation application are stored locally (e.g., in storage 312), and data for use by the content recommendation application is downloaded on a periodic basis (e.g., from an out-of-band feed, from an Internet resource, or using another suitable approach). Control circuitry 310 may retrieve instructions for the content recommendation application from storage 312 and process the instructions to perform the functionality described herein. Based on the processed instructions, control circuitry 310 may determine what action to perform when input is received from user input interface 322.

In client/server-based embodiments, control circuitry 310 may include communication circuitry suitable for communicating with a content recommendation application server (e.g., server 301) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 358). In some embodiments, communication network 358 may be the same as network 208. In another example of a client/server-based application, control circuitry 310 runs a web browser that interprets web pages provided by a remote server (e.g., server 301). For example, the remote server may store the instructions for the application in a storage device. The remote server may process the stored instructions using circuitry (e.g., control circuitry 302) and generate the displays discussed above and below. Computing device 360 may receive the displays generated by the remote server and may display the content of the displays locally via display 320. This way, the processing of the instructions is performed remotely (e.g., by server 301) while the resulting displays, such as the display windows described elsewhere herein, are provided locally on computing device 360. For example, computing device 360 may include display circuitry (e.g., video card circuitry or combination motherboard and video card circuitry) configured to generate for display the display windows. Computing device 360 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a remote control, trackball, keypad, keyboard, touchscreen, touchpad, stylus input, joystick, voice recognition interface, or other user input interfaces. User input interface 322 may be integrated with or combined with display 320, which may be a monitor, television, liquid crystal display (LCD), electronic ink display, or any other equipment suitable for displaying visual images.

Server 301 and computing device 360 may receive content and data via input/output (hereinafter "I/O") path 308 and 316, respectively. For instance, I/O path 316 may include circuitry that includes one or more of communication port configured to receive a live content stream from server 301 and/or media content source 354 via a communication network 358. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Figure 4:
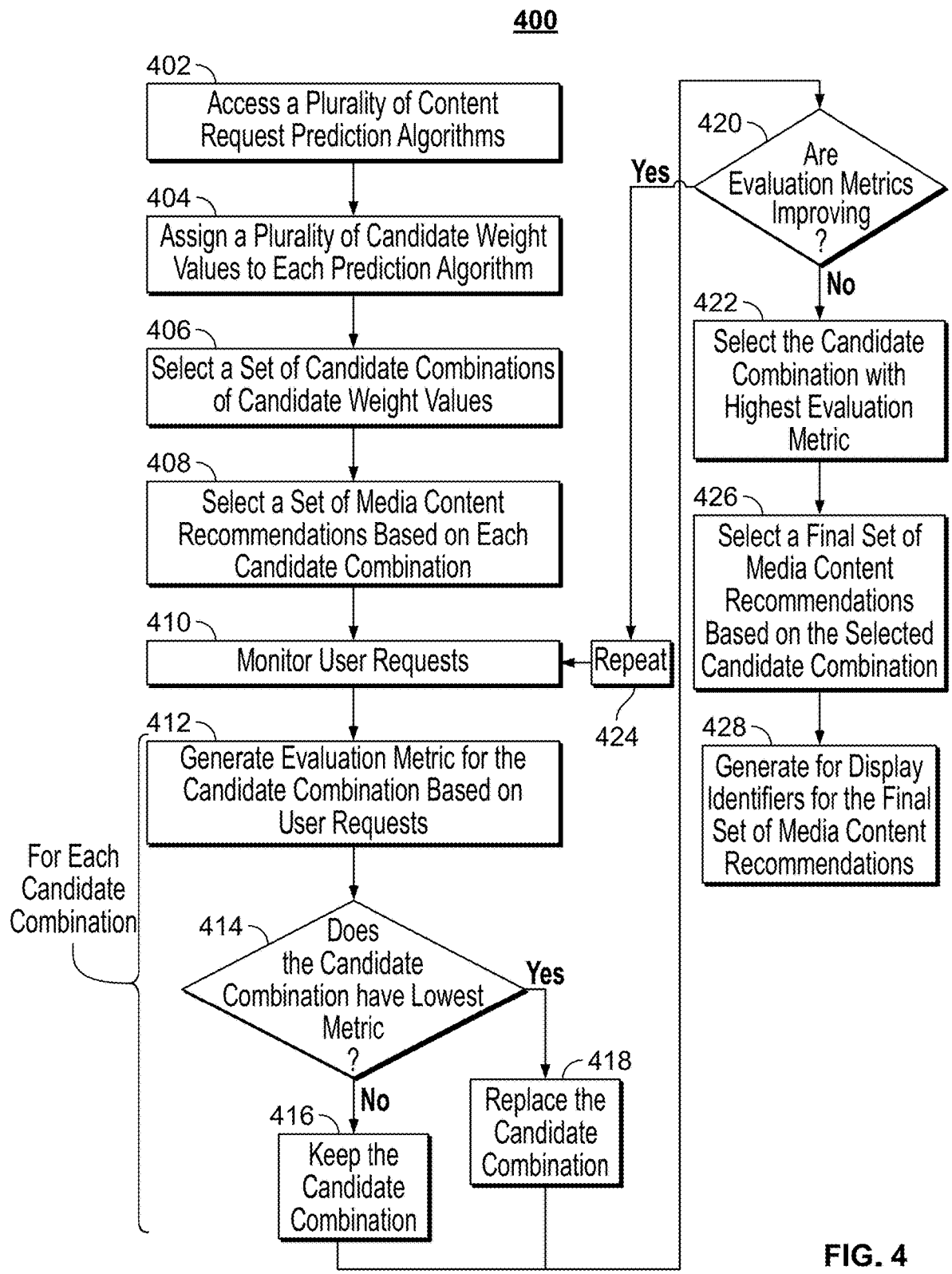
FIG. 4 depicts an illustrative flowchart of a process for providing media content recommendations, in accordance with some embodiments of the disclosure.

Having described systems 200 and 300, reference is now made to FIG. 4, which depicts an illustrative flowchart of process 400 for providing media content recommendations that may be implemented by using systems 200 and 300, in accordance with some embodiments of the disclosure. In various embodiments, the individual steps of process 400 may be implemented by one or more components of systems 200 and 300. Although the present disclosure may describe certain steps of process 400 (and of other processes described herein) as being implemented by certain components of systems 200 and 300, this is for purposes of illustration only, and it should be understood that other components of systems 200 and 300 may implement those steps instead. For example, steps of process 400 may be executed by server 302 and/or by computing device 360 to provide content recommendations.

At step 402, control circuitry 310 accesses a plurality of recommendation algorithms (e.g., content request prediction algorithms). In some embodiments, control circuitry 310 may access the content request prediction algorithms via an API from server 302, or from media content guidance data source 356. For example, control circuitry 310 may provide input for the algorithms and receive results via communications network 358. In another embodiment, control circuitry 310 may store the algorithm locally in storage 312. In some embodiments, a wide range of content request prediction algorithms may be accessed.

For example, control circuitry 310 may use a recommendation algorithm, e.g., as described in U.S. Pat. No. 6,388,714 and in U.S. Pat. No. 6,756,997 (both of which are hereby incorporated by reference herein in their entirety). Control circuity 310 may also use an algorithm configured to predict which tv series a user will consume at a given time of day based on that user's previous viewing behavior (e.g., series prediction algorithm). Control circuity 310 may also use an algorithm configured to predict what type of an object (e.g., one of a Movie object, a Series object, an Episode object, a Program object, and a Sports Event object) a user will consume at a given time of day based on that user's previous viewing behavior. Control circuity 310 may also use an algorithm configured to predicts which genre of TV series a user will consume at a given time of day based on that user's previous viewing behavior. Control circuitry 310 may also use an algorithm configured to predicts which content a user will consume based on popularity rankings of content with other users. Control circuity 310 may also use an algorithm configured to predicts which content a user will consume based on characteristics of content that user put in a "favorites" list. Control circuity 310 may also use an algorithm configured to predicts which content a user will consume based on what series the user has recently been watching a lot of (e.g., binging on). Control circuity 310 may also use an algorithm configured to predicts which content a user will consume based on what content the user has finished watching. Control circuity 310 may also use an algorithm configured to predicts which content a user will consume based on how old or new the content is. Control circuity 310 may also use an algorithm configured to predicts which content a user will consume based on explicit feedback received from the user (e.g., thumbs up or down rating or numerical rating). Control circuity 310 may also use an algorithm configured to predicts which content a user will consume based on the amount of interest expressed by other users in a sporting event. Control circuity 310 may also use an algorithm configured to predicts which content a user will consume based on sematic similarity of content to previously consumed content.

Control circuitry 310 may send a user name as input to the algorithm. In some embodiments, control circuitry 310 may send user historical requests or behavior data as input to the algorithm. In yet another embodiment, control circuitry 310 may send demographics selection (e.g., selection of people aged 18-45, or selection of people aged 3-6). Each of the algorithms may use the input data to generate a set of predicted media content items (e.g., a list of movies and TV shows).

At step 404, control circuitry 310 may assign a plurality of weight values to each prediction algorithm. For example, control circuitry 310 may assign weight values randomly, by applying heuristics (e.g., which algorithms were used most often in the past). For example, initial weight values (e.g., weights 104, 106, 108) may be created as shown in exemplary example of FIG. 1. In some embodiments, control circuitry 310 may calculate initial weight value for a prediction algorithm by dividing a constant (e.g., "3") by an average of top 10 scores of that prediction algorithm, and adding a random number (e.g., a random number in a range between −0.5 and 0.5). Any other way of generating initial weight values may also be used.

At 404, control circuitry 310 may generate or select a set of candidate weight combinations. For example, for each candidate weight combination, each one of the algorithms may be assigned a weight value generated in step 404. In some embodiments, the initial combination may be random. However, subsequent candidate weight combinations may be generated in accordance with an iterative differential evolution algorithm, as will be explained below.

At 406, control circuitry 310 may generate a set of recommended content items based on the plurality of the prediction algorithms and weight values of each particular candidate combination. For example, each algorithm may be used to generate its own list of preliminary recommended (e.g., predicted) content items. Then the preliminary predicted content items are weighted using the weights of the particular candidate combination, and, at step 408, the final selection of set of media content items is made for each candidate combination. An exemplary embodiment of such a technique is explained in more detail in FIGS. 6 and 7.

At step 410, control circuitry 310 monitors user requests (e.g., requests to watch or to store a media content item). For example, control circuitry 310 may track received requests for content items over a predetermined period of time. For example, control circuitry 310 may track requests by a single user, or by a group of users (e.g., 2000 particularly active users in a selected demographic category). For example, control circuitry 310 may track requests for media content received at media content sources 354, or at server 301 via communications network 358.

Steps 412-416 may be performed for each candidate weight combination. For example, for a particular candidate combination, at step 412, control circuitry 310 may generate an evaluation metric based on a match between the requests for content items and the set of recommended content items generated for the particular candidate combination. For example, if the set of recommended content items matched a larger number of requests, it may receive a high evaluation metric (e.g., a metric that is proportional to the number of matches). In another example, if the set of recommended content items matched a small number of requests, it may receive a low evaluation metric. An exemplary embodiment of such a calculation is explained in more detail in to FIGS. 6 and 7.

At 414, control circuitry 310 may search for the candidate combination that generated the lowest evaluation metric. Such a candidate combination may be replaced at step 418. At step 416, candidate combinations that generated evaluation metrics that are not the lowest may be kept. In some embodiments, instead of replacing only the candidate combination which generated the lowest evaluation metric, all candidate combination that performed poorly may be replaced. For example, the bottom 50% of the candidate combinations may be replaced. In some embodiments, a pre-set or dynamic threshold may be used to sort candidate combinations. In some embodiments, candidate combinations to be replaced are determined using differential evolution techniques.

In some embodiments, a candidate combination is replaced with another combination of weights based on differential evolution techniques in order to maximize evaluation metrics. For example, control circuitry 310 may replace a poorly performing candidate combination with a candidate combination generated by mutating one of candidate combinations that resulted in a generation of a promising evaluation metric (e.g., a candidate combination that resulted in an evaluation metric that exceeded the threshold). In another example, control circuitry 310 may replace a poorly performing candidate combination with a candidate combination generated by crossing over two or more of the candidate combinations that resulted in a generation of a promising evaluation metric (e.g., a candidate combination that resulted in evaluation metrics that exceeded the threshold).

At 420, control circuitry 310 may check if the evaluation metrics are improving. For example, while steps 410-418 are being performed, control circuitry 310 may maintain a historical high evaluation metric (e.g., the value of the highest evaluation metric is stored in a constant in storage 312) for each iteration cycle. After each cycle of steps 410-418, control circuitry 310 may compare all historical high evaluation metrics of previous cycles. For example, the last five cycles may have resulted in historical high evaluation metric of {40, 50, 55, 55, 55}. Because last three historical high evaluation metrics ({50, 50, 50}) are not increasing, control circuitry 310 may determine that evaluation metrics have stopped improving. In some embodiments, improvements that are lower than certain margin (e.g., less than 1%) may be treated the same as historical high evaluation metrics that has stopped increasing. For example, the last five cycles may have resulted in historical high evaluation metrics of {40, 50, 55, 56, 57}. Because the last three historical high evaluation metrics ({55, 56, 57}) are not increasing by a sufficiently high margin, control circuitry 310 may determine that evaluation metrics have stopped improving.

If the evaluation metrics are still improving, control circuitry 310 repeats 424 steps 410-418. Otherwise, control circuitry 310 proceeds to step 422. At step 422, control circuitry 310 selects candidate weight combination that resulted in the highest evaluation metrics. This weight combination is then used in the production of recommendations. For example, at step 426, control circuitry 310 may use the selected candidate weight combination to select a final set of media content items. In some embodiments, this final set may be reported to other devices (e.g., via communications network 358). In some embodiments, control circuitry 310 may, at step 428, generate for display identifiers for the final set of recommended content items. For example, the identifiers for recommended content items may be displayed on display 320 by server 301 or media content source 354. In some embodiments, the user may select content for consumption by interacting with the identifiers (for example, by clicking on the identifiers). Identifiers may be simple text identifiers, or graphical identifiers that include cover art and/or other data (release date, actors list, etc.). In some embodiments, the final set of recommended content items may be used for other purposes. For example, content that is predicted to be requested by a large demographic may be placed in edge distribution servers for faster delivery based on predicted demand for some content items.

Figure 5:
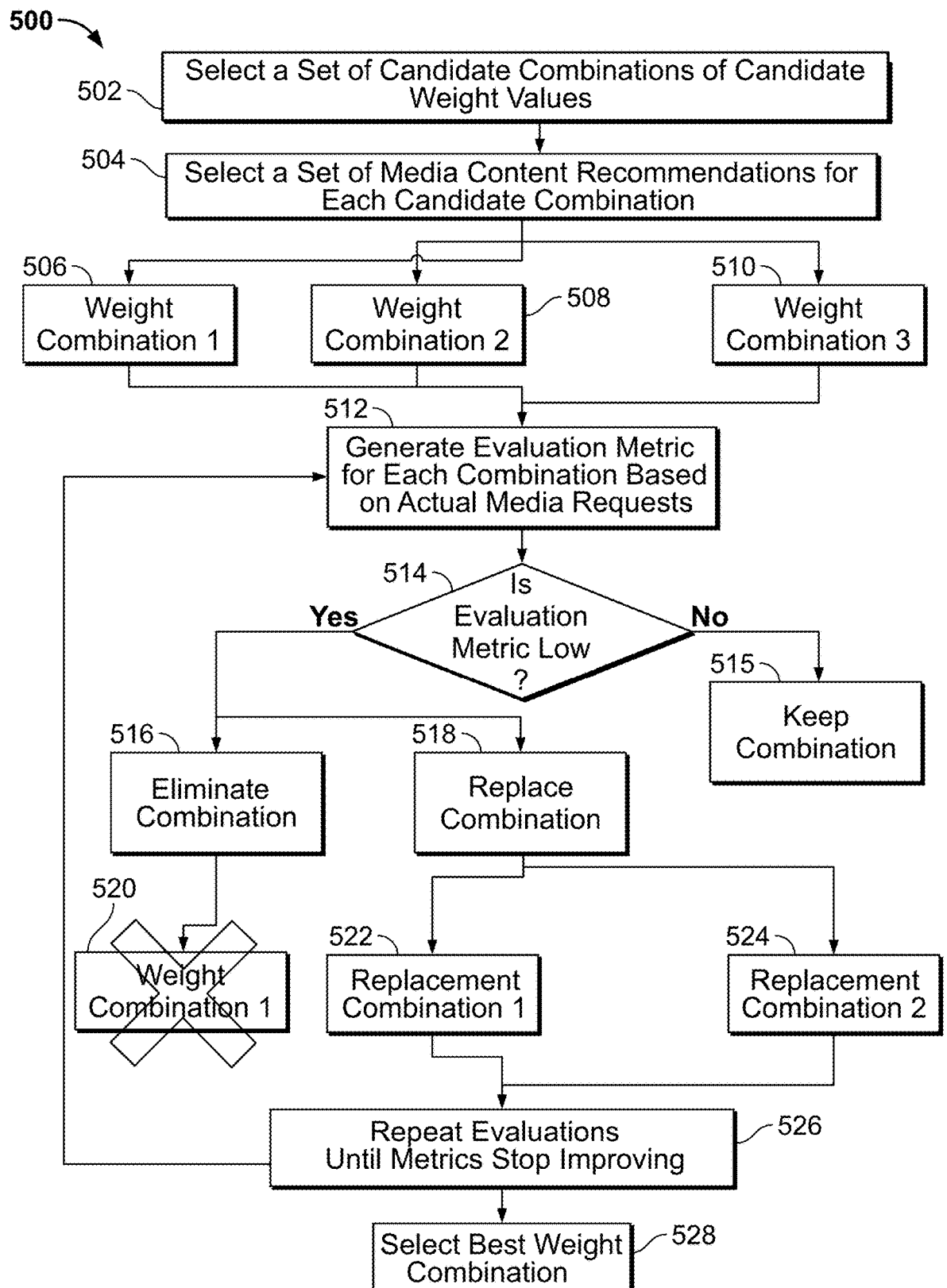
FIG. 5 depicts an illustrative flowchart of a process for selecting candidate weight combinations, in accordance with some embodiments of the disclosure.

FIG. 5 depicts an illustrative flowchart of process 500 for selecting candidate weight combinations that may be implemented by using systems 200 and 300, in accordance with some embodiments of the disclosure. In various embodiments, individual steps of process 500 may be implemented by one or more components of systems 200 and 300. Although the present disclosure may describe certain steps of process 500 (and of other processes described herein) as being implemented by certain components of systems 200 and 300, this is for purposes of illustration only, and it should be understood that other components of systems 200 and 300 may implement those steps instead. For example, steps of process 500 may be executed by server 202 and/or by computing device 260 to provide content recommendations. In some embodiments, control circuitry 310 may use process 500 as part of process 400 of FIG. 4 (e.g., in addition to or instead of steps 410-418).

At step 502, control circuitry 310 may generate multiple sets of candidate weight combinations (e.g., weight combinations 104, 106, 108 of FIG. 1). In some embodiments, at least some of the weight combinations may be randomized. Any number of candidate weight combinations may be generated. At step 504, a set of media content items is selected based on each of the candidate combinations. For example, at 506, a set of media content items is selected using weight combination 104. At 508, a set of media content items is selected using weight combination 106. And, at 510, a set of media content items is selected using weight combination 108.

At step 512, control circuitry 310 may evaluate the performance of each weight combination generated in steps 506-510. For example, to test a candidate weight combination, control circuitry 310 may generate an evaluation metric for each weight combination based on matches with requested content items over a certain period of time (e.g., one day or one week.) For example, the method described above in step 412 may be used to generate an evaluation metric.

Steps 514-524 may be performed for each weight combination (e.g., for weight combinations 104, 106, and 108). At 514, control circuitry 310 may check if the evaluation metric for a particular weight combination is low. For example, control circuitry 310 may select only the weight combination that scored the lowest for replacement. In some embodiments, control circuitry 310 may select all weight combinations that scored below a threshold for replacement. If the combination is not low, then, at step 515, control circuitry 310 may keep that weight combination in storage 312. At 516, weight combination with low evaluation metrics may be eliminated. For example, at 520, control circuitry 310 may completely delete the lowest scoring weight combination from storage 312. Additionally, at 518, control circuitry 310 may generate a replacement combination in any one of the ways described at step 522 or step 524 below.

Figure 9:
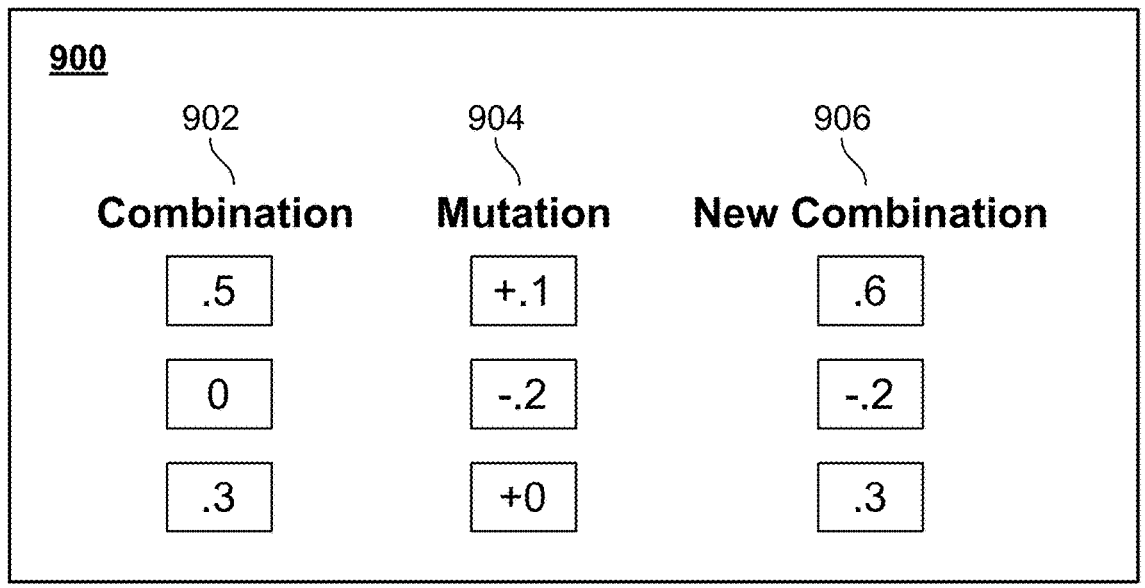
FIG. 9 depicts an illustrative scenario for generating a replacement weight combination, in accordance with some embodiments of the disclosure.
Figure 10:
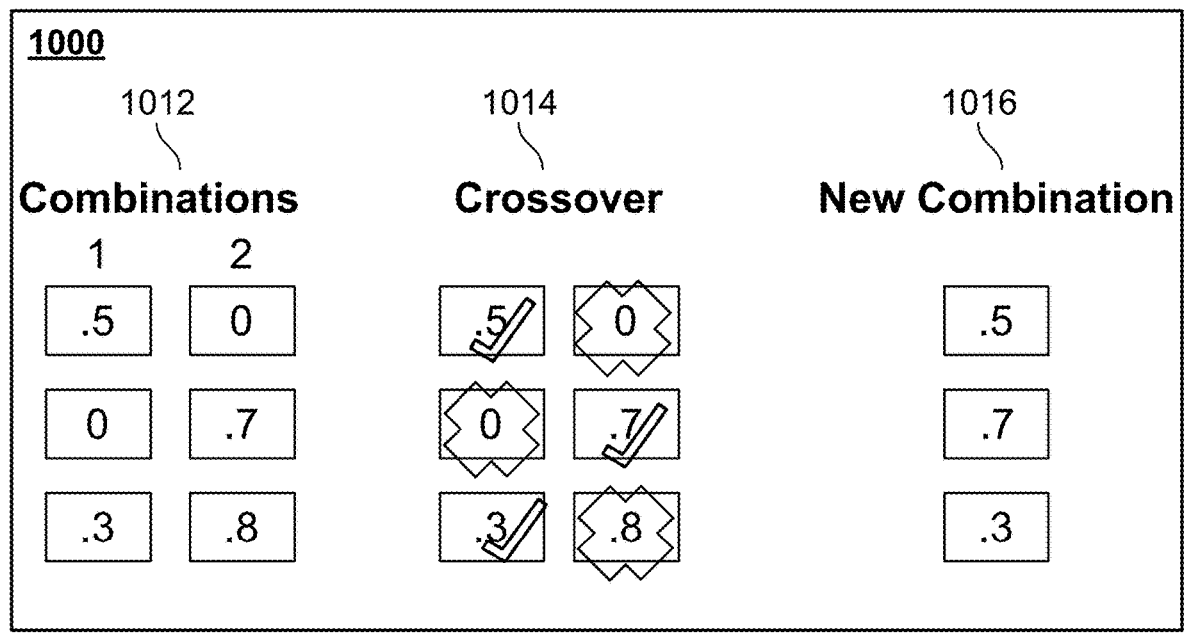
FIG. 10 depicts another illustrative scenario for generating a replacement weight combination, in accordance with some embodiments of the disclosure.

For example, at 522, control circuitry 310 may generate a new weight combination by mutating one of the other weight combinations (e.g., as shown in FIG. 9). At 524, control circuitry 310 may generate a new weight combination by crossing over two other weight combinations (e.g., as shown in FIG. 10).

At 526, control circuitry 310 may repeat steps 502-524 for newly replaced weight combinations until evaluation metrics stop improving (e.g., if the historically high evaluation metrics stagnate over certain number of cycles). At 528, the highest-scoring weight combination is selected to be used (e.g., for selecting recommendations for display).

Figure 6:
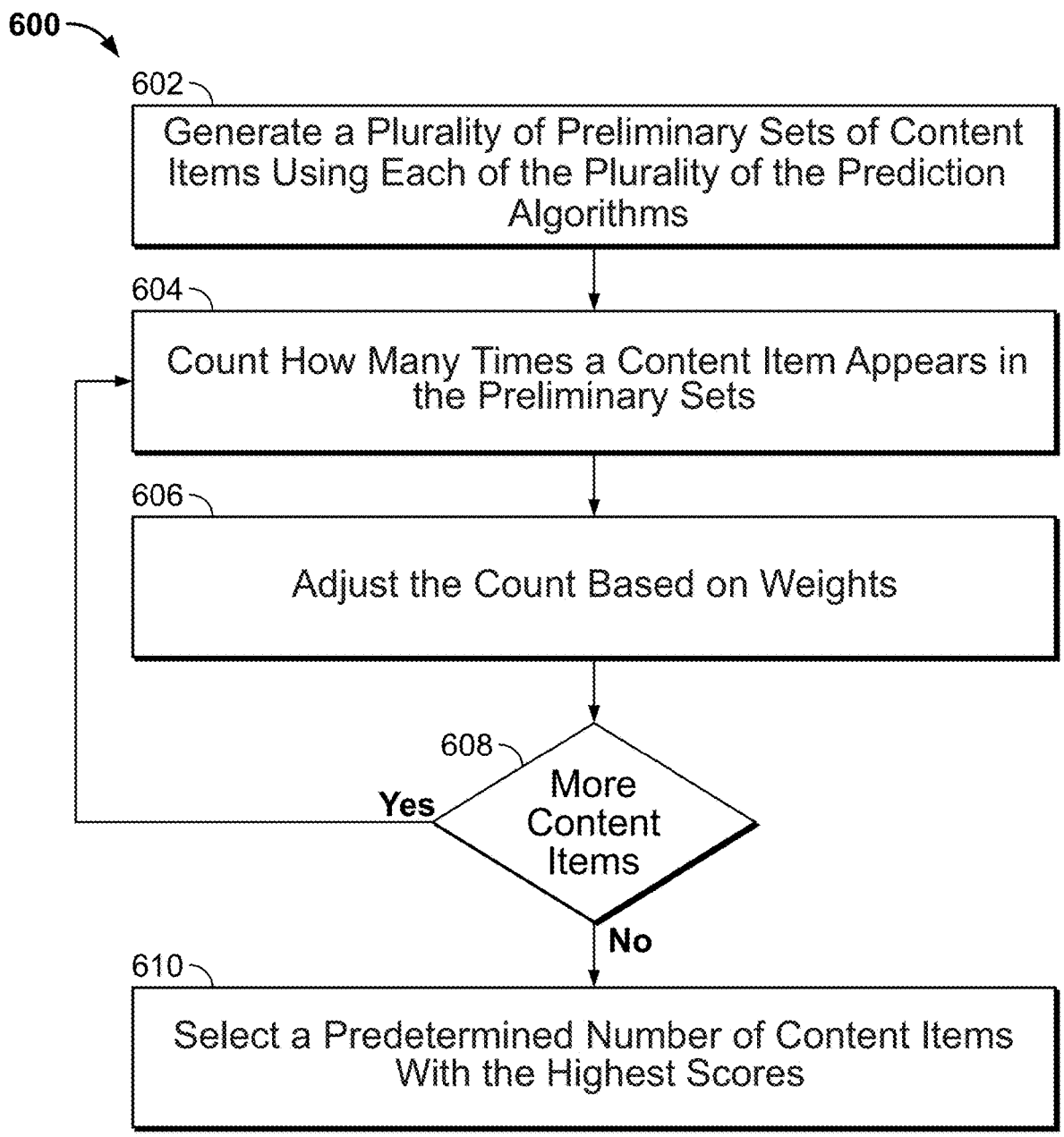
FIG. 6 depicts an illustrative scenario for generating a set of content items for a candidate weight combination, in accordance with some embodiments of the disclosure.

FIG. 6 depicts an illustrative flowchart of process 600 for generating a set of content items for a candidate weight combination that may be implemented by using systems 200 and 300, in accordance with some embodiments of the disclosure. In various embodiments, the individual steps of process 600 may be implemented by one or more components of systems 200 and 300. Although the present disclosure may describe certain steps of process 600 (and of other processes described herein) as being implemented by certain components of systems 200 and 300, this is for purposes of illustration only, and it should be understood that other components of systems 200 and 300 may implement those steps instead. For example, the steps of process 600 may be executed by server 302 and/or by computing device 360 to provide content recommendations. In some embodiments, control circuitry 310 may use process 600 as a part of process 400 of FIG. 4 (e.g., in addition to or instead of step 408). For example, control circuitry 310, when performing step 408, may use process 600 to select content items for a particular weight combination.

At 602, control circuitry 310 may generate a preliminary set of content items using each available prediction algorithm. For example, control circuitry 310 may issue an API call to server 301 to run each available prediction algorithm with a specified input (e.g., input specifying desired user demographics). In this example, server 301 executes each prediction algorithm and returns a preliminary set of predicted content items for each prediction algorithm via communications network 358.

At 604, control circuitry 310 may count how many times a particular content item has appeared in any of the preliminary sets of predicted content items. For example, if a "Game of Thrones" episode appeared in three preliminary sets of predicted content items, the count of "3" may be stored for that "Game of Thrones" episode.

At 606, control circuitry 310 may adjust the count values based on the weight assigned to each prediction algorithm. For example, if the "Game of Thrones" episode appeared in a preliminary set of predicted content items generated by a prediction algorithm with a weight "0.3," the count may be reduced proportionally to the weight. For example, only 0.3 points may be added to the count instead of a regular "1" point.

At 608, control circuitry 310 may check if more content items are left to be evaluated. If so, control circuitry 310 returns to 604 and repeats the process until a count has been established for each content item. Once no more items remain, control circuitry 310 proceeds to step 610. At 610, control circuitry 310 selects a predetermined number (e.g., 10) content items with the highest score for inclusion in the set of items for the particular weight combination.

In some embodiments, instead of adding up the adjusted count values as described in connection with steps 606-610, control circuitry 310 may select for inclusion into the set of items for the particular weight combination the content items that have the greatest associated weight in any of the preliminary set of predicted content items. In other embodiments, any other algorithms or techniques for inclusion of content items into the set of items for the particular weight combination may be used.

Figure 7:
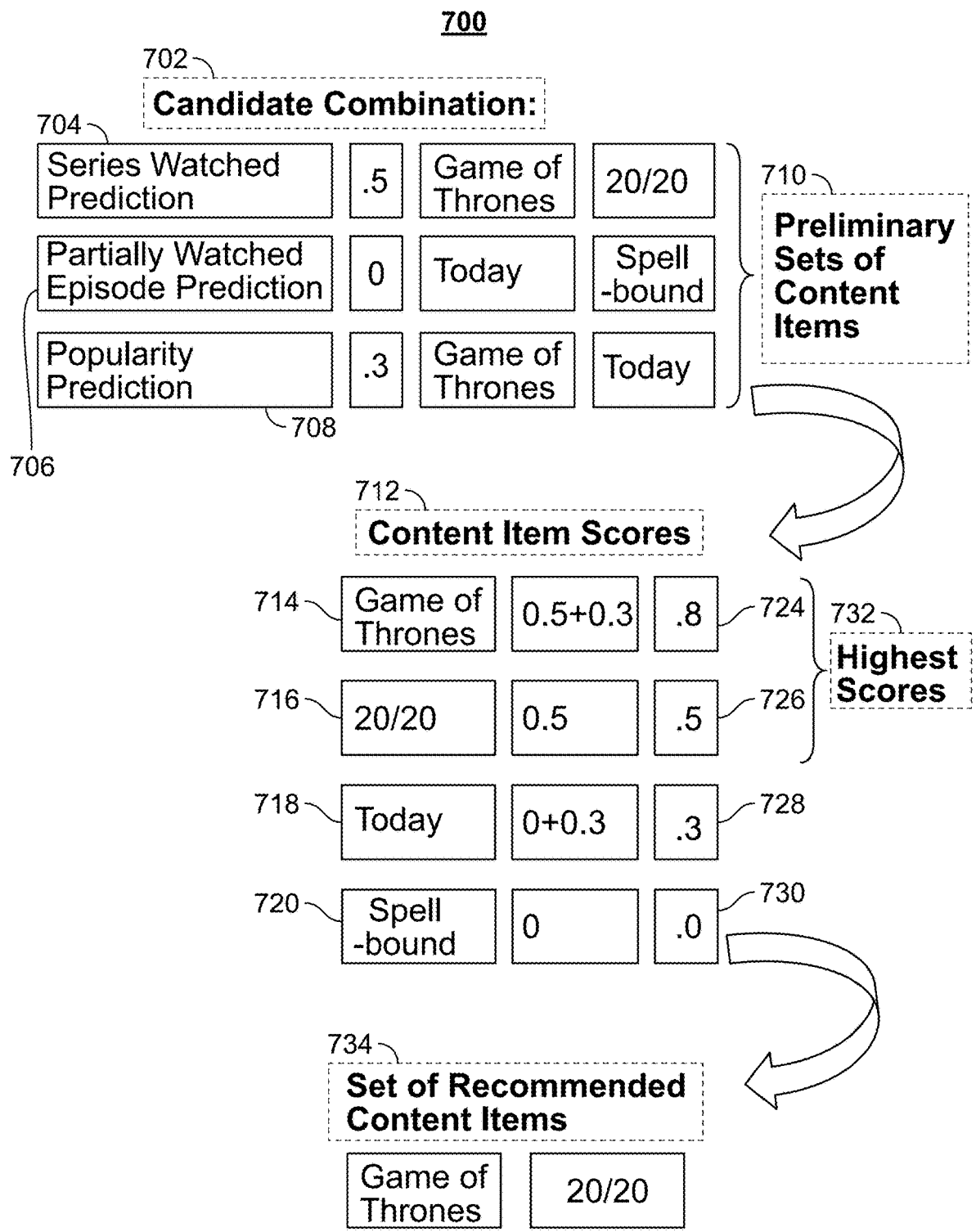
FIG. 7 depicts an illustrative flowchart of a process for generating a set of content items for a candidate weight combination, in accordance with some embodiments of the disclosure.

FIG. 7 depicts an illustrative scenario for generating a set of content items for a candidate weight combination that may be implemented by using systems 200 and 300, in accordance with some embodiments of the disclosure. In particular, FIG. 7 depicts an exemplary way to generate a set of content items for candidate weight combination 702. In some embodiments, illustrative scenario of FIG. 7 may be performed as part of step 408 of FIG. 4.

As shown, weight combination 702 assigns a value of 0.5 to first prediction algorithm 704, a value of 0 to second prediction algorithm 706, and a value of 0.3 to third prediction algorithm 708. Each of the algorithms may be used to generate a preliminary set of content items. For example, control circuitry 310 may issue an API call to server 301 to execute each of algorithms 704, 706, and 708. Server 301 may then return over communications network 358 the following preliminary set of content items: set {Game of Thrones, 20/20} for algorithm 704, set {Today, Spellbound} for algorithm 706, and set {Game of Thrones, Today} for algorithm 708.

In some embodiments, control circuitry 310 may then calculate content item counts 712 for each content item from the preliminary set of content items. The count may be weighted based on the weights of each of algorithms 704, 706, 708. For example, "Game of Thrones" appears twice, once in the set produced using algorithm 704 and once in the set produced using algorithm 708. In this scenario the "Game of Thrones" content item may receive a total score 724 of "0.8" (0.5 from weight of algorithm 704 and 0.3 from weight of algorithm 708, which are summed). Scores 726, 728, and 730 for content items 20/20, Today, and Spellbound may be calculated in a similar manner.

Control circuitry 310 may then select the set of content items with the highest score for candidate weight combination 702. For example, because "Game of Thrones" content item and "20/20" have the highest counts (0.8 and 0.5, respectively), they are selected for the set of content items associated with the candidate weight combination 702.

It is to be noted, that the techniques described in FIG. 7 is exemplary, and other techniques may be used to select content items for the set of content items associated with the candidate weight combination 702. For example, control circuity 310 may select content items "Game of Thrones," and "20/20" because they appear in the preliminary set with the highest weight.

Figure 8:
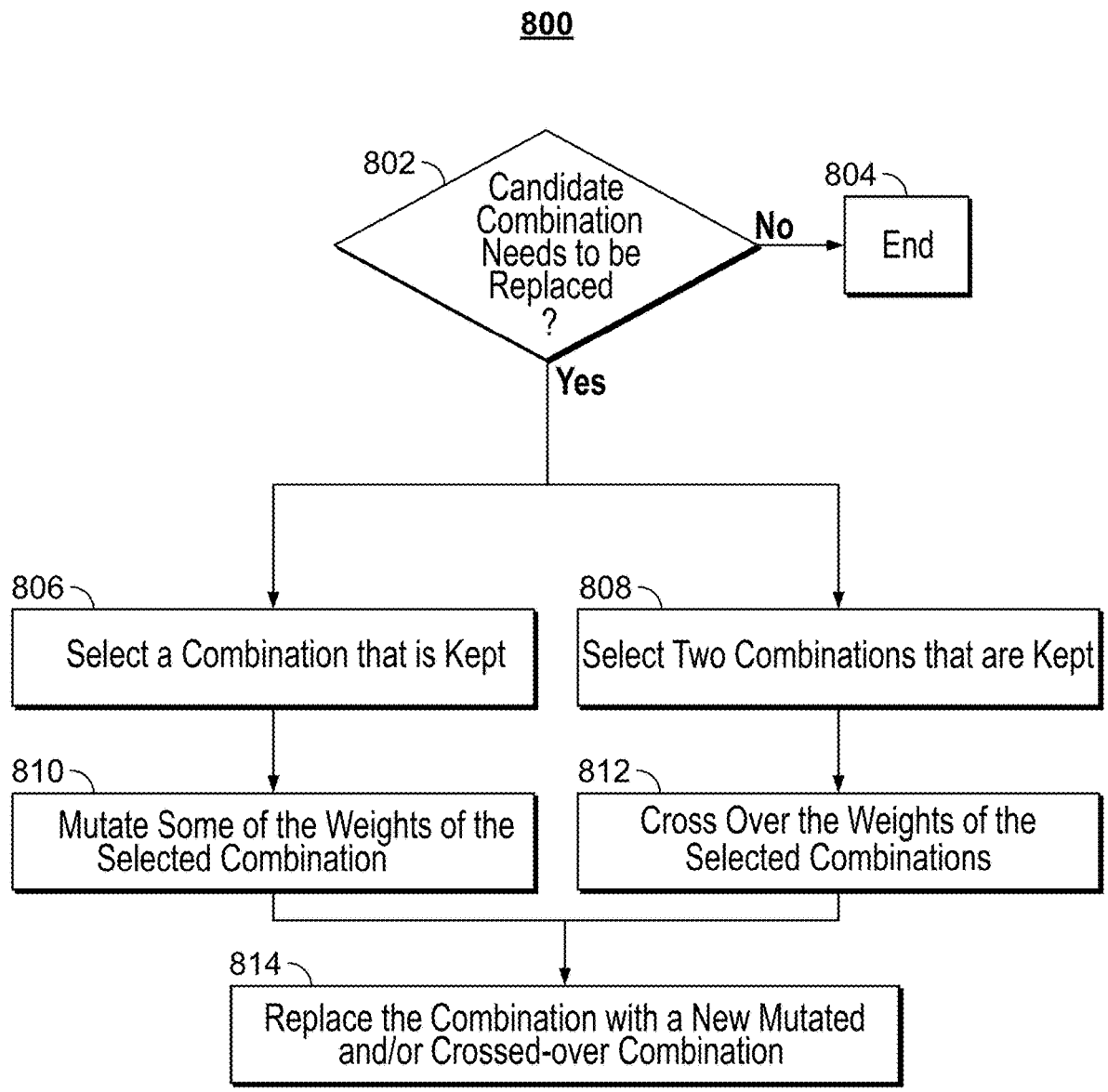
FIG. 8 depicts an illustrative flowchart of a process for generating a replacement weight combination, in accordance with some embodiments of the disclosure.

FIG. 8 depicts an illustrative flowchart of process 800 for replacing a candidate weight combination that may be implemented by using systems 200 and 300, in accordance with some embodiments of the disclosure. In various embodiments, individual steps of process 800 may be implemented by one or more components of systems 200 and 300. Although the present disclosure may describe certain steps of process 500 (and of other processes described herein) as being implemented by certain components of systems 200 and 300, this is for purposes of illustration only, and it should be understood that other components of systems 200 and 300 may implement those steps instead. For example, steps of process 800 may be executed by server 302 and/or by computing device 360 to provide content recommendations. In some embodiments, control circuitry 310 may use process 800 as a part of process 400 of FIG. 4 (e.g., in addition to or instead of step 418). For example, control circuitry 310, when performing step 418, may use process 800 to generate a replacement weight combination.

At 802, control circuitry 310 may determine whether a particular weight combination needs to be replaced. For example, steps 410-414 of FIG. 4 may be used to perform this determination. If the particular weight combination does not need to be replaced, process 800 ends at step 804. Otherwise, process 800 proceeds to steps 806 and 808. In some embodiments, steps 806-810 and 808-812 may be performed selectively (i.e., only one may be performed), simultaneously, or one after the other.

At 806, control circuitry 310 may select one other candidate weight combination that is determined to be kept. This weight combination is mutated at step 810. For example, some of the weights of the other candidate weight combination may be micro-adjusted (e.g., by using 5%-10% adjustment). In some embodiments, the value of adjustment may be selected using differential evolution algorithms. In some embodiments, the mutated weight combination may be normalized (e.g., so that all weights add up to the same constant).

At 808, control circuitry 310 may select two other candidate weight combinations that are determined to be kept. These weight combinations are crossed over at step 812. For example, some of the weights of other candidate weight combination and some weights of the second other candidate weight combination are used to create a new weight combination. In some embodiments, the crossed-over weight combination may be normalized (e.g., so that all weights add up to a constant).

At 814, the new mutated or crossed-over combination is used as the replacement combination. In some embodiments, the new weight combination can be both crossed over and mutated in any order.

FIG. 9 depicts an illustrative scenario for mutating a candidate weight combination that may be implemented by using systems 200 and 300, in accordance with some embodiments of the disclosure. In particular, FIG. 9 depicts an exemplary mutation of a candidate weight combination 902. For example, the steps of FIG. 9 may be performed as part of step 418 of FIG. 4.

As shown, a candidate weight combination assigns values of {0.5; 0; and 0.3} to three recommendation (e.g., prediction) algorithms. At 904, a mutation factor is applied. For example, the first weight is modified by 0.1," the second weight is modified by −0.2, and the third weight is modified by 0 (i.e., not modified). These adjustment values may be selected by a differential evolution algorithm attempting to maximize the evaluation metric. As a result, the mutated combination 906 assigns values of {0.6; −0.2; and 0.3} to three prediction algorithms. It should be noted that a negative weight may indicate that content items generated by this algorithm may be counted negatively. The mutated combination 906 may then be normalized (not shown).

FIG. 10 depicts an illustrative scenario for crossing over a candidate weight combination that may be implemented by using systems 200 and 300, in accordance with some embodiments of the disclosure. In particular, FIG. 10 depicts an exemplary crossover of candidate weight combinations 1012. For example, steps of FIG. 10 may be performed as part of step 418 of FIG. 4.

As shown, candidate weight combination 1 assigns values of {0.5; 0; and 0.3} to three predictions algorithms, while candidate weight combination 2 assigns values of {0; 0.7; and 0.8} to the same three predictions algorithms. At 1014, a crossover occurs. In this example, values 0.5 and 0.3 of the first weight combination are kept, and value 0.7 of the second weight combination is kept. The kept weights are combined into a new combination 1016 that assigns values of {0.5; 0.7; and 0.3} to three predictions algorithms. The crossed-over combination 1016 may then be normalized (not shown).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   (a) accessing a plurality of recommendation algorithms;
   (b) generating a plurality of candidate weight combinations, wherein each candidate weight combination of the plurality of candidate weight combinations comprises, for each respective recommendation algorithm of the plurality of recommendation algorithms, a corresponding weight;
   (c) using the plurality of candidate weight combinations to generate a first plurality of content item recommendations, wherein each respective content item recommendation of the first plurality of content item recommendations is generated using a respective candidate weight combination of the plurality of candidate weight combinations;

(d) receiving a first plurality of requests for content items of the first plurality of content item recommendations over a first period of time;

(e) determining, for each of the first plurality of requests received at (d), which candidate weight combination of the plurality of candidate weight combinations was used to generate the requested content item;

(f) generating, for each respective candidate weight combination of the plurality of candidate weight combinations, an evaluation metric based on a number of the first plurality of requests determined at (e) to correspond to a content item generated using the respective candidate weight combination of the plurality of candidate weight combinations;

(g) modifying the plurality of candidate weight combinations by replacing a candidate weight combination of the plurality of candidate weight combinations having a lowest evaluation metric with a new candidate weight combination, wherein the new candidate weight combination is generated based on combining two or more candidate weight combinations, of the plurality of candidate weight combinations, each having an evaluation metric exceeding a threshold;

(h) using the modified plurality of candidate weight combinations to generate a second plurality of content item recommendations, wherein each respective content item recommendation of the second plurality of content item recommendations is generated using a respective candidate weight combination of the modified plurality of candidate weight combinations;

(i) receiving a second plurality of requests for content items of the second plurality of content item recommendations over a second period of time;

(j) determining, for each of the second plurality of requests received at (i), which candidate weight combination of the modified plurality of candidate weight combinations was used to generate the requested content item;

(k) generating, for each respective candidate weight combination of the modified plurality of weight combinations, an updated evaluation metric based on a number of the second plurality of requests determined at (i) to correspond to a content item generated using the respective candidate weight combination of the modified plurality of candidate weight combinations;

(l) comparing the updated evaluation metrics of the modified plurality of weight combinations to historical evaluation metrics to determine whether the updated evaluation metrics of the modified plurality of weight combinations have improved by a threshold margin with respect to the historical evaluation metrics, wherein the historical evaluation metrics comprise at least the evaluation metrics generated at (f);

(m) based, at least in part, on determining that the updated evaluation metrics of the modified plurality of weight combinations have not improved by the threshold margin:

(m)(1) identifying a candidate weight combination of the modified plurality of candidate weight combinations having a highest evaluation metric;

(m)(2) using the identified candidate weight combination to generate a third plurality of content item recommendations; and (m)(3) causing identifiers associated with the third plurality of content item recommendations to be generated for display.

2. The method of claim 1, wherein each of the plurality of recommendation algorithms is based on a record of user requests.

3. The method of claim 1, wherein the corresponding weight is selected by randomly selecting a weight value.

4. The method of claim 1, wherein generating the first plurality of content item recommendations comprises:
generating a plurality of preliminary sets of content items using each of the plurality of the recommendation algorithms;
assigning a score to each content item of the respective sets of content items based on how often it appeared in the plurality of preliminary sets and the weight of the recommendation algorithms of those preliminary sets; and
selecting a predetermined number of content items with the highest scores.

5. The method of claim 1, wherein the modifying of the plurality of candidate weight combinations is performed based on determining that the evaluation metrics generated at (f) improved by the threshold margin with respect to evaluation metrics for a plurality of candidate weight combinations used to generate a third plurality of content item recommendations at a third time period prior to the first time period.

6. The method of claim 1, wherein replacing the candidate weight combination of the plurality of candidate weight combinations having the lowest evaluation metric comprises:
comparing the evaluation metrics of the plurality of candidate weight combinations to a threshold; and
replacing the candidate weight combination that resulted in a generation of the evaluation metric that did not exceed the threshold.

7. The method of claim 1, wherein generating the new candidate weight combination based on combining two candidate weight combinations each having an evaluation metric exceeding the threshold comprises:
selecting a plurality of values corresponding to the two candidate weight combinations by selecting a first subset of the plurality of values from a first candidate weight combination of the two or more candidate weight combinations and selecting a second subset of the plurality of values from a second candidate weight combination of the two or more candidate weight combinations.

8. The method of claim 1, wherein the threshold margin is at least one of a preset threshold or a dynamic threshold.

9. The method of claim 1, wherein the plurality of recommendation algorithms comprises at least one of a series watched prediction algorithm, a partially watched episode prediction algorithm, or a popularity prediction algorithm.

10. The method of claim 1, wherein the first period of time and the second period of time each correspond to a predetermined length of time.

11. A system comprising:
input/output (I/O) circuitry;
control circuitry configured to:
(a) access a plurality of recommendation algorithms;
(b) generate a plurality of candidate weight combinations, wherein each candidate weight combination of the plurality of candidate weight combinations comprises, for each respective recommendation algorithm of the plurality of recommendation algorithms, a corresponding weight;
(c) use the plurality of candidate weight combinations to generate a first plurality of content item recommendations, wherein each content item recommendation of the first plurality of content item recommendations is generated using a respective candidate weight combination of the plurality of candidate weight combinations;
(d) receive a first plurality of requests for content items of the first plurality of content item recommendations over a first period of time, wherein the requests are received via the I/O circuitry;
(e) determine, for each of the first plurality of requests received at (d), which candidate weight combination of the plurality of candidate weight combinations was used to generate the requested content item;
(f) generate, for each respective candidate weight combination of the plurality of candidate weight combinations, an evaluation metric based on a number of the first plurality of requests determined at (e) to correspond to a content item generated using the respective candidate weight combination of the plurality of candidate weight combinations;
(g) modify the plurality of candidate weight combinations by replacing a candidate weight combination of the plurality of candidate weight combinations having a lowest evaluation metric with new candidate weight combination, wherein the new candidate weight combination is generated based on combining two or more candidate weight combinations, of the plurality of candidate weight combinations, each having an evaluation metric exceeding a threshold;
(h) use the modified plurality of candidate weight combinations to generate a second plurality of content item recommendations, wherein each respective content item recommendation of the second plurality of content item recommendations is generated using a respective candidate weight combination of the modified plurality of candidate weight combinations;
(i) receive a second plurality of requests for content items of the second plurality of content item recommendations over a second period of time, wherein the requests are received via the I/O circuitry;
(j) determine, for each of the second plurality of requests received at (i), which candidate weight combination of the modified plurality of candidate weight combinations was used to generate the requested content item;
(k) generate, for each respective candidate weight combination of the modified plurality of weight combinations, an updated evaluation metric based on a number of the second plurality of requests determined at (j) to correspond to a content item generated using the respective candidate weight combination of the modified plurality of candidate weight combinations;
(l) compare the updated evaluation metrics of the modified plurality of weight combinations to historical evaluation metrics to determine whether the updated evaluation metrics of the modified plurality of weight combinations have improved by a threshold margin with respect to the historical evaluation metrics, wherein the historical evaluation metrics comprise at least the evaluation metrics generated at (f);
(m) based, at least in part, on determining that the updated evaluation metrics of the modified plurality of weight combinations have not improved by the threshold margin:
(m)(1) identify a candidate weight combination of the modified plurality of candidate weight combinations having a highest evaluation metric;
(m)(2) use the identified candidate weight combination to generate a third plurality of content item recommendations; and
(m)(3) cause identifiers associated with the third plurality of content item recommendations to be generated for display.

12. The system of claim 11, wherein each of the plurality of recommendation algorithms is based on a record of user requests.

13. The system of claim 11, wherein the corresponding weight is selected by randomly selecting a weight value.

14. The system of claim 11, wherein the control circuitry is configured to generate the first plurality of content item recommendations by:
generating a plurality of preliminary sets of content items using each of the plurality of the recommendation algorithms;
assigning a score to each content item of the respective sets of content items based on how often it appeared in the plurality of preliminary sets and the weight of the recommendation algorithms of those preliminary sets; and
selecting a predetermined number of content items with the highest scores.

15. The system of claim 11, wherein the control circuitry is configured to modify the plurality of candidate weight combinations based on determining that the evaluation metrics generated at (f) improved by the threshold margin with respect to evaluation metrics for a plurality of candidate weight combinations used to generate a third plurality of content item recommendations at a third time period prior to the first time period.

16. The system of claim 11, wherein the control circuitry is further configured to replace the candidate weight combination of the plurality of candidate weight combinations having the lowest evaluation metric by:
comparing the evaluation metrics of the plurality of candidate weight combinations to a threshold; and
replacing the candidate weight combination that resulted in a generation of the evaluation metric that did not exceed the threshold.

17. The system of claim 1, wherein the control circuitry is to generate the new candidate weight combination based on combining two candidate weight combinations each having an evaluation metric exceeding the threshold by:
selecting a plurality of values corresponding to the two candidate weight combinations by selecting a first subset of the plurality of values from a first candidate weight combination of the two or more candidate weight combinations and selecting a second subset of the plurality of values from a second candidate weight combination of the two or more candidate weight combinations.

18. The system of claim 11, wherein the threshold margin is at least one of a preset threshold or a dynamic threshold.

19. The system of claim 11, wherein the plurality of recommendation algorithms comprises at least one of a series watched prediction algorithm, a partially watched episode prediction algorithm, or a popularity prediction algorithm.

20. The system of claim 11, wherein the first period of time and the second period of time each correspond to a predetermined length of time.

\* \* \* \* \*